(12) United States Patent
Zave et al.

(10) Patent No.: US 7,386,108 B1
(45) Date of Patent: *Jun. 10, 2008

(54) ROUTING EXTENSIONS FOR TELECOMMUNICATION NETWORK SYSTEM AND METHOD

(75) Inventors: Pamela Zave, Chatham, NJ (US); Michael A. Jackson, London (GB)

(73) Assignee: AT&T Corp., New York, NY (US)

(*) Notice: Subject to any disclaimer, the term of this patent is extended or adjusted under 35 U.S.C. 154(b) by 172 days.

This patent is subject to a terminal disclaimer.

(21) Appl. No.: 10/836,780

(22) Filed: Apr. 30, 2004

Related U.S. Application Data

(63) Continuation-in-part of application No. 10/165,928, filed on Jun. 10, 2002, now Pat. No. 6,826,275, which is a continuation of application No. 09/676,868, filed on Sep. 29, 2000, now Pat. No. 6,404,878, which is a continuation of application No. 09/644,128, filed on Aug. 23, 2000, now Pat. No. 6,990,185, which is a continuation of application No. 09/034,681, filed on Mar. 4, 1998, now Pat. No. 6,160,883.

(60) Provisional application No. 60/204,334, filed on May 15, 2000, provisional application No. 60/199,089, filed on Apr. 21, 2000, provisional application No. 60/166,563, filed on Nov. 19, 1999, provisional application No. 60/154,877, filed on Sep. 20, 1999.

(51) Int. Cl.
*H04M 3/42* (2006.01)
(52) U.S. Cl. .................... 379/201.04; 379/247
(58) Field of Classification Search ............ 379/88.02, 379/88.13, 221.14, 201.04, 247
See application file for complete search history.

(56) References Cited

U.S. PATENT DOCUMENTS

| | | | | |
|---|---|---|---|---|
| 5,311,586 A | * | 5/1994 | Bogart et al. | 379/221.14 |
| 6,327,346 B1 | * | 12/2001 | Infosino | 379/88.02 |
| 6,459,776 B1 | * | 10/2002 | Aktas et al. | 379/88.13 |

* cited by examiner

*Primary Examiner*—Gerald Gauthier
(74) *Attorney, Agent, or Firm*—Peter V. D. Wilde

(57) ABSTRACT

A distributed features system is disclosed which permits a telecommunication network to accommodate the creation of open multimedia services. It is an object of the present invention to create an architecture that facilitates modularity and compositional service creation. It is another object of the present invention to support multimedia services, e.g. services that include voice, graphics, video and text components. It is another object of the present invention to provide an architecture that is general, flexible, permits third party feature development, and can interact with other networks.

9 Claims, 16 Drawing Sheets

```
1000    [box, boxType, feature, symbol, customer, dataRelation]
1001
1002    LIBox: P box
1003    TIBox: P box
1004    RIBox: P box
1005    BFBox: P box
1006    FFBox: P box
1007
1008    disjoint<LIBox,TIBox,RIBox,BFBox,FFBox>
1009
1010    IBox == LIBox ∪ TIBox ∪ RIBox
1011    FBox == BFBox ∪ FFBox
1012
1013
1014    BFBoxType: P boxType
1015    FFBoxType: P boxType
1016
1017    disjoint<BFBoxType,FFBoxType>
1018    FBoxType == BFBoxType ∪ FFBoxType
1019
1020    boundType: BFBox →→ BFBoxType
1021    freeType: FFBox →→ FFBoxType
1022
1023
1024    providesFeatures: FBoxType →→ feature
1025
1026    zone ::= source | dialed | target
1027
1028    boxZone: FboxType ↔ zone
1029
1030    dom boxZone = FboxType
1031
1032    (BFBoxType ◁ boxZone ▷ {dialed}) = ∅
1033
1034    precedence: (FboxType × zone) ↔ (FboxType × zone)
1035
1036    ∀t1, t2: FboxType, z1, z2: zone •
1037        ( ((t1, z1),(t2, z2)) ∈ precedence) ⇒ ( (z1=source) ∨ (z2 = target) ∨ (z1 = z2) )
1038
1039    (dom precedence ∪ ran precedence) ⊆ boxZone
```

Figure 6A

1040 AAlphabet: P symbol
1041 SAlphabet: P symbol
1042
1043 AAlphabet ⊂ SAlphabet
1044
1045 AString = seq AAlphabet
1046 SString = seq SAlphabet
1047
1048 address ⊂ AString
1049
1050 dialedTrigger: SString ↔ FFBType
1051 ran dialedTrigger = dom (boxZone ▷ {dialed})

Figure 6B

1060 LAddress: P address
1061 TAddress: P address
1062 RAddress: P address
1063 MAddress: P address
1064
1065 disjoint<LAddress, TAddress, RAddress, MAddress>
1066
1067 ◇ ∈ address \ (LAddress ∪ TAddress ∪ RAddress ∪ MAddress )
1068
1069 LMap: LAddress >−↠ LIBox
1070
1071 TMap: TAddress ↔ TIBox
1072
1073 dom TMap = TAddress
1074
1075 RMap: RAddress ↔ RIBox
1076
1077 QMap: RIBox −↠ RAddress
1078
1079 QMap = RMap
1080
1081 owner: Caddress −↠ customer
1082
1083 Caddress ⊆ (LAddress ∪ TAddress ∪ MAddress )

| | |
|---|---|
| 1100 | subscribes: address ↔ (boxZone ▷ {source,target}) |
| 1101 | |
| 1102 | dom subscribes ⊆ (LAddress ∪ TAddress ∪ RAddress ∪ MAddress ) |
| 1103 | |
| 1104 | boundTo: BFBox → address |
| 1105 | |
| 1106 | ∀a: address, t: BFBType • (∃z: zone • a subscribes(t,z)) ⇒ (∃ !b: BFBox • b boundTo a ∧ b boundType t) |
| 1107 | |
| 1108 | |
| 1109 | supportsFeature: dataRelation ↔ feature |
| 1110 | |
| 1111 | supportsCustomer: P datarelation |
| 1112 | |
| 1113 | opRelation == dom supportsFeature ∪ supportsCustomer | source: address
dialed: SString
target: address
route: seq boxZone
command: routingCommand
zoneModifier: P zone
boxModifier: FBoxType

Figure 7 source = "the LAddress of the line interface"
target = ◇
route = ◇
command = new

Figure 8A source = "some TAddress"
target = ◇
route = ◇
command = new

Figure 8B

ROUTING EXTENSIONS FOR TELECOMMUNICATION NETWORK SYSTEM AND METHOD

RELATED APPLICATIONS

This application is a continuation of application Ser. No. 09/644,128 filed Aug. 23, 2000 now U.S. Pat. No. 6,990,185.

This application claims priority to Provisional Application "Routing Extensions For Telecommunications Network System and Method," Ser. No. 60/154,877, filed on Sep. 20, 1999; "DFC: Signaling and Media Extensions," Ser. No. 60/166,563, filed on Nov. 19, 1999; "Eclipse: Software Architecture for Next Generation Telecommunications," Ser. No. 60/199,089, filed on Apr. 21, 2000; "New Feature Interactions in Mobile and Multimedia Telecommunication Services," Ser. No. 60/204,334, filed on May 15, 2000, the contents of which are incorporated by reference herein.

This application is a continuation-in-part of application Ser. No. 10/165,928, filed Jun. 10, 2002, now U.S. Pat. No. 6,826,275 which is a continuation of application Ser. No. 09/676,868 filed Sep. 29, 2000, now U.S. Pat. No. 6,404,878 which is a continuation of application Ser. No. 09/034,681, filed Mar. 4, 1998 now U.S. Pat. No. 6,160,883.

FIELD OF THE INVENTION

The invention relates to telecommunications networks, and more particularly to advanced architectures for the description of telecommunication services.

BACKGROUND OF THE INVENTION

The feature-interaction problem arises from the incremental, feature-by-feature, extension of telecommunications system functionality. As new features such as call forwarding, call waiting, or three-way calling have been added to telecommunication systems, it has become increasingly difficult to manage the behavioral complexity of the features and their interactions. Redesign of old features to fit smoothly with the new features is scarcely ever a practical option. Eventually, the resulting complexity damages the quality and productivity of all phases of telecommunication software development.

In the pending utility application, "Telecommunication System and Method," Ser. No. 09/034,681, filed on Mar. 4, 1998, which is incorporated by reference herein, the inventors introduced an architecture for managing the feature-interaction problem. The inventors presented a virtual architecture for telecommunication systems, which they called distributed feature composition (DFC), in which a feature corresponds to a component type; each telephone call is handled by building a configuration of instances of these components, according to the features to be applied to that particular call. The feature component instances communicate by featureless internal calls that are connected by the underlying architectural substrate. A new feature is specified by describing its corresponding component type (or occasionally, new feature is specified by describing its corresponding component type (or occasionally, two component types) and the rules for including the component instances into configurations.

DFC was designed in the context of a conventional telephony call for feature modularity, structured feature composition, analysis of feature interaction, and separation of service and transmission layers. Conventional telephony, however, deals only with a single medium (i.e. voice), a single network architecture (the PSTN), and very nearly a single device (the POTS telephone). Modern networks and devices pose new challenges: what was once a hard problem has become even harder, with the rapid proliferation of different types of devices, different network architectures (e.g., the Internet, Cable, Wireless, etc.), and multi-media (voice, text, video, etc.). Devices are evolving and proliferating more quickly than service software can be adapted. Service logic issues are often intertwined with transmission issues, which works against portability. Network providers have adopted a variety of service architectures and APIs, preventing interoperation even when interoperation is their goal. Incremental features have an unclear impact on previously developed features, making it difficult for knowledgeable and trusted programmers to implement enhancements (to say nothing of third party contributions, which are typically out of the question altogether).

Accordingly, it is an object of the present invention to remedy the above and other problems by enhancing and modifying DFC to accommodate open telecommunication systems, mobile telecommunication users, multimedia telecommunication services, unified messaging, and other aspects of modern telecommunication systems and services.

SUMMARY OF THE INVENTION

A distributed features system is disclosed which permits a telecommunication network to accommodate the creation of open multimedia services. It is an object of the present invention to create an architecture that facilitates modularity and compositional service creation. It is another object of the present invention to support multimedia services, e.g. services that include voice, graphics, video and text components. It is another object of the present invention to provide an architecture that is general, flexible, permits third party feature development, and can interact with other networks.

In accordance with an embodiment of the present invention, routing extensions for a distributed feature system are disclosed which accommodate mobile users as well as a broader range of media choices than conventional telephony. An individual utilizing a distributed features system is associated with a plurality of addresses, not all of which identify a particular line interface to a communication device. Features are subscribed to in the distributed feature system by interface address or by a mobile address that can be associated dynamically with different line interfaces. This structure of customers and addresses is advantageous in that a single customer can utilize the same or different features regardless of what type or whose communication device the customer is utilizing.

In accordance with another embodiment of the present invention, the distributed feature system architecture assigns control-intensive media processing tasks to resource interfaces which can be accessed in the same manner as any feature component. This structure has the advantage of preserving the modularity of the architecture while permitting complicated services utilizing control-intensive media processing such as voice recognition or recording and playback.

In accordance with another embodiment of the present invention, various different possible services such as feature-based mobility and automatic media choice are described which arise naturally from the many advantages of the modular structure of the instant architecture.

These and other aspects and advantages of the invention will be apparent to those of ordinary skill in the art by reference to the following detailed description and the accompanying drawings.

BRIEF DESCRIPTION OF THE DRAWINGS

FIGS. 6A through 6D are a formal specification of relations between types and data in accordance with a preferred embodiment of the present invention.

FIGS. 7, 8A, and 8B are examples of setup message formats for routing in a distributed feature system in accordance with a preferred embodiment of the present invention.

DETAILED DESCRIPTION

Figure 1:
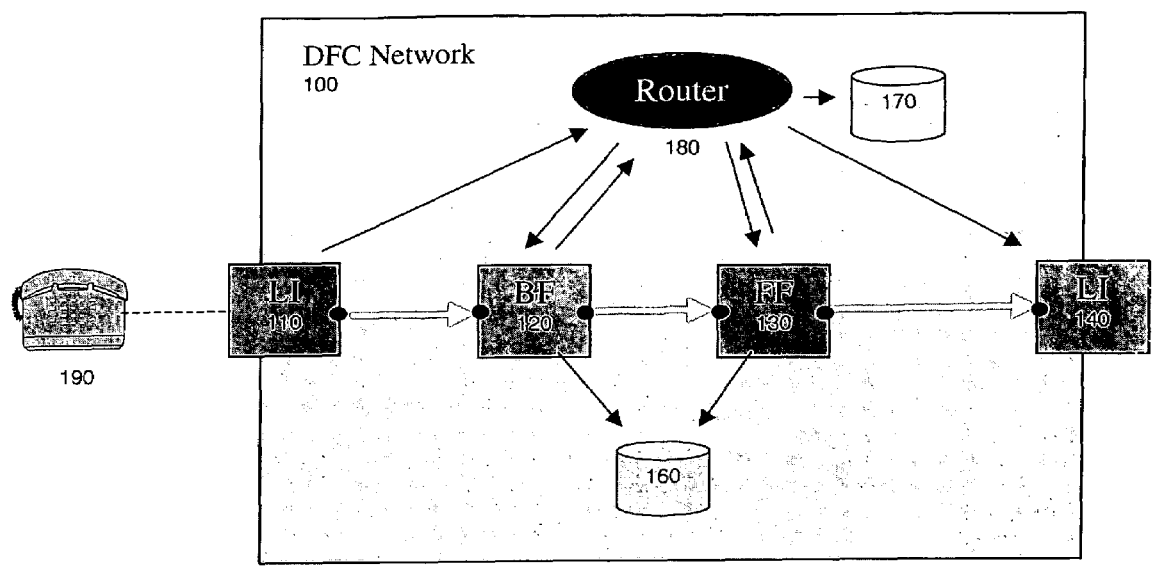
FIG. 1 is an abstract diagram of a distributed feature system.

FIG. 1 sets forth an example of an abstract diagram of a distributed feature system, adapted in accordance with a preferred embodiment of the present invention. The distributed feature system represents a virtual architecture for describing telecommunication services by separating logic that provides service feature functionality into separate distributed components. The present invention is described in the context of DFC, although the principles of the present invention can be readily extended by one of ordinary skill in the art to other distributed feature architectures.

As depicted in FIG. 1, the virtual network 100 comprises one or more routers 180 and a plurality of primitive components called "boxes", e.g. 110 through 140 in FIG. 1 (these are referred to interchangeably as boxes or modules). The boxes have well-defined interfaces and have structured access to operational data (e.g. depicted in FIG. 1 as 160) to help them fulfill their designated roles in the telecommunications system. The boxes have ports for inter-box communication, depicted in FIG. 1 as black dots. The line interface ("LI") 110, 140 demarcate the edges of the distributed feature system logical network and serve to translate between the native protocols of the system and that of the particular hardware or software endpoint (here depicted as a telephone 190). Feature boxes 120, 130 are the unit of modularity in service construction and can have any number of ports, depending on their various functions.

For clarity, the inventors refer to a "customer call" as the informal notion of an attempt by one customer to communicate with another. A customer call typically generates and is responded to by a "usage", which is a dynamic assembly of boxes and "internal calls." The communication channels between the interface boxes participating in a usage are characterized as an "internal call" (or as a "featureless internal call"). The internal calls are shown in FIG. 1 as arrows from a port that places the call (a "caller port") to a port that receives the call (a "callee port").

In accordance with the DFC embodiment, feature boxes are instantiated and inserted into a usage by some form of router, shown in FIG. 1 as 180. An internal call begins with a setup phase in which the initiating port on line interface box 110 sends a setup signal to the router 180, and the router 180 chooses a box and forwards the signal to it. The receiving box 120 chooses an idle port for the call (if any) and completes the setup phase with a signal back to the initiating port. From that time until what is referred to as a "teardown phase", the internal call exists and advantageously has a two-way signaling channel. Unlike the original version of DFC, the call can also have any number of media channels, each carrying any medium. Because there is no default configuration of media channels in a call (for example, it is not necessary for a call to have a voice channel), each media channel in a call must be opened and closed explicitly by signals on the signaling channel. The call and channel protocols are described in further detail in co-pending utility application "Protocol Extensions for Telecommunication Network System and Method," filed contemporaneously with the present application, and incorporated by reference herein.

The feature box 120 continues the process by having another port send a setup request to the router 180 for another internal call to another feature box 130, and so on. The boxes are dynamically assembled in a graph that connects the set of interface boxes participating in the communication usage at the given moment. The feature boxes serve to implement the features/services that apply to the particular usage. Signaling propagates through the chain of feature boxes, which implement behaviors based on the sequence of events which take place as well as other considerations. Having full control of all the calls it places or receives, a feature box has the autonomy to fulfill its purpose without external assistance. It can behave transparently when no function is needed. It can also behave assertively, re-routing calls, processing media streams, and absorbing/generating signals.

Feature modularity can be guaranteed in DFC by the rules governing feature boxes. It is advantageous to make the interfaces well-defined such that any two boxes are guaranteed to be composable. It is advantageous for boxes to be unable to discern the type of the feature box they are communicating with; that knowledge would allow them to behave specially depending on neighboring behavior, which would violate feature modularity. It is also advantageous to impose strict rules governing the sharing of data between feature boxes of different types or between feature boxes serving different subscribers. Such rules permit feature box developers to develop modular feature boxes, e.g., feature boxes that implement a particular behavior without regard to the presence or absence of other features in the system.

The router of the virtual network is unusual. It not only routes internal calls to the destinations associated with their target addresses, as any network router does, but it also "applies features" by routing internal calls to and from feature boxes. For this reason it is assumed to have access to data 170, e.g. such as feature subscriptions, feature precedences, and the dialing plan as well as normal configuration data. Although a single centralized routing node is shown in FIG. 1, a distributed routing scheme can also be utilized with the routing data centralized or partitioned accordingly. It is also advantageous to divide the routing behavior into three zones: the "source" zone, the "dialed" zone, and the "target" zone. Features in the source zone are applied to all usages requested by the source caller; features in the target zone are applied to all usages directed to a particular target callee; features in the dialed zone are applied according to the particular string dialed by the caller regardless of the features sets to which the caller and callee subscribe.

As further described in co-pending utility application, "Telecommunication Network System and Method", It is also advantageous to categorize boxes into "free" boxes and "bound" boxes. A bound box is a unique, persistent, addressable individual. A free box is an anonymous, interchangeable copy of its type with no persistence outside of its tenure in a usage. In original DFC, bound boxes were bound to a particular line interface. Mirroring the conventions of telephony, the original specification of DFC identified line interfaces, and in turn implicitly the customers using the line interfaces, by directory number ("DN") and provided built-in alternative billing features which extract DNs from specific types of dialed strings (e.g. where the DN is preceded by the "0" digit for collect calls).

Addresses and Mobile Addresses

It is advantageous to expand the concept of the directory number to encompass the broader concept of an "address," the new name emphasizing its increased generality. As more formally defined below, an "address" is simply a sequence of symbols from an addressing alphabet. It is also advantageous to have alternative billing features provided by a separate feature box that extracts and places the proper address in the target field of its outgoing setup message, as further described below.

Figure 2:
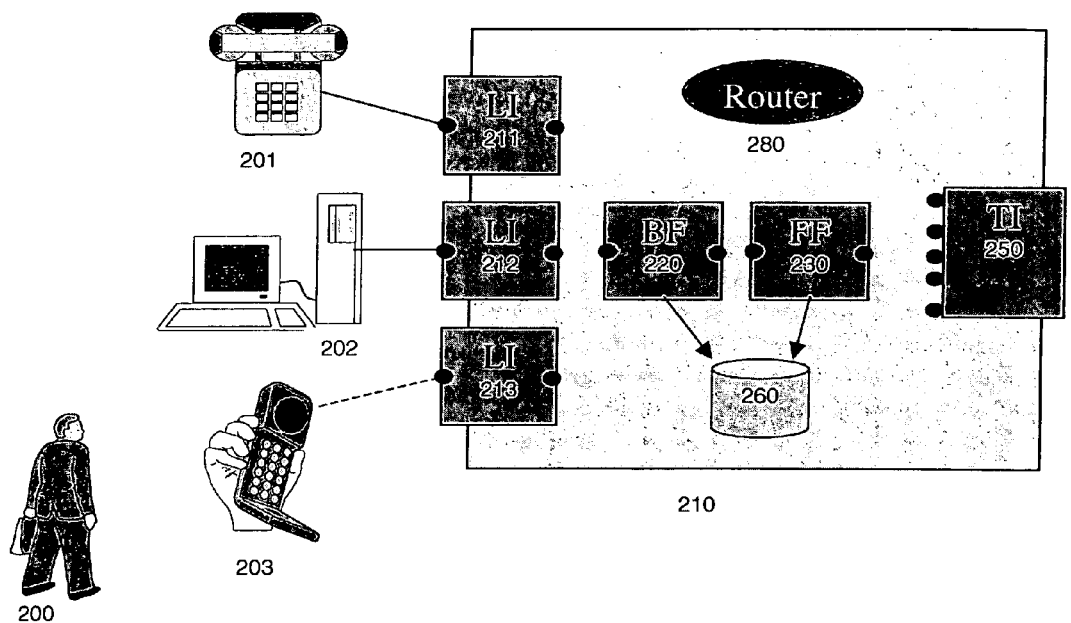
FIG. 2 is an abstract diagram of a distributed feature system illustrating an embodiment of the present invention.

In accordance with another embodiment of the present invention, a customer can utilize a plurality of addresses recognized by the distributed feature system and features are subscribed to in the distributed feature system by address. Furthermore, bound feature boxes can be advantageously bound to addresses rather than particular line interfaces. This structure of customers and addresses is advantageous in that a single customer might use different devices for different media, as suggested by FIG. 2. With reference to FIG. 2, the customer 200 has access to a number of communication devices 201-203. There is no limitation on the type of communication device that can be potentially interfaced to the telecommunication network, e.g. it can be a land-line telephone (201), a mobile cellular telephone (203), a videophone, a personal computer (202), a personal digital assistant, a pager, an instant messenger client, an H.323 client, a networked electronic whiteboard, etc. In accordance with a preferred embodiment of the present invention, each communication device has an active or inactive communication link/connection to a line interface box, e.g. 211-213 in FIG. 2, and an address that can be used to subscribe to features appropriate for the device.

The line interface boxes translate between the particular line protocol utilized by the communication device and the protocol of the virtual network 210. Even where the particular device is deactivated (e.g. when the mobile telephone 203 in FIG. 2 is turned off), the line interface can remain active to the distributed feature system. The physical location of the device and the line interface and the implementation of the line between them is not relevant to service descriptions and can thus be invisible to the distributed features system. Subject to observing the feature system protocols, the line interface can behave in any way that is deemed appropriate for the customer (e.g. it can reject all incoming calls or accept calls and play an announcement).

Another motivation for the address structure is that a customer might want addresses that can be associated dynamically with different interfaces, either for mobility or media choice. Thus, in accordance with another embodiment of the present invention, the distributed feature system recognizes a "mobile address," which is defined as an address that has no permanent association with a particular interface in the system. In other words, the address cannot serve as a unique identifier for an interface and has no static mapping to a specific interface. Rather, the mobile address subscribes to features that perform dynamic address translation as needed.

For example, with reference to FIG. 2, as customer 200 moves from the vicinity of one device to another, the mobile customer's communication needs can be met by features that create dynamic associations between the customer and the various interface boxes. For example, customer 200 may use a mobile address m that is dynamically associated with the different addresses of the devices and permits the customer to move transparently among them. The association between m and other customer addresses could be stored in customer operational data accessible to the virtual network 210. The address m would subscribe to a feature box that would either forward unconditionally to the line address of the line interface with which m is currently associated, or would hunt (either sequentially or in parallel) among the various line interfaces of the customer for an answer to a call.

Figure 3:
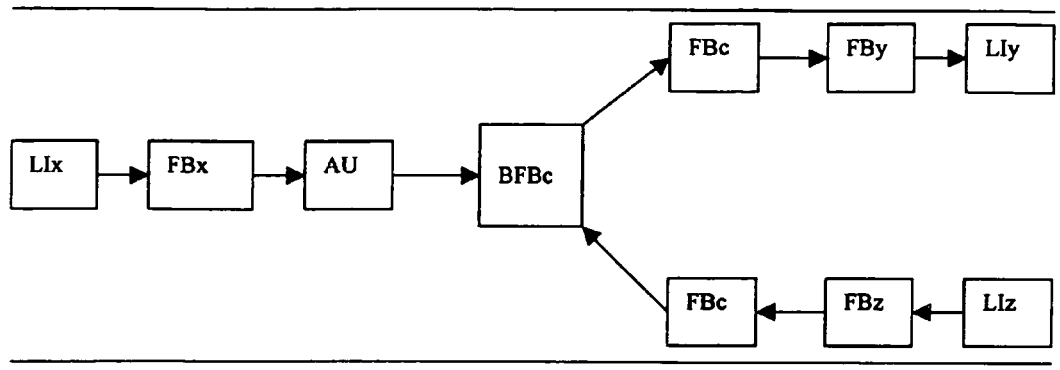
FIGS. 3 through 5 are abstract diagrams of feature components in a distributed feature system illustrating other embodiments of the present invention.

As an example, the customer's mobile address m can also be associated dynamically with addresses that have nothing to do with the customer, e.g. the addresses of pay telephones, telephones in rental cars, telephones belonging to friends, etc. In this case, the customer of m cannot assume that an address she is using temporarily has any features at all. So, m must subscribe to all the feature boxes the customer wishes to use, including bound feature boxes. FIG. 3 illustrates a possible usage that can arise that permits a customer c's mobile address to be associated with a temporary address belonging to the line interface of individual x. Customer c makes a call using x's communication device that reaches an authentication feature box, labeled AU in FIG. 3. The authentication feature can demand a password or some other proof of identity, after which it makes an outgoing call utilizing the customer's mobile address (in the DFC implementation described below, the feature would issue a setup message with the customer's mobile address in the source field and "new" in its command field). This call and its continuation calls would be routed through the source feature boxes associated with the mobile address. In FIG. 3, for example, the customer's mobile address is subscribed to a call conferencing and switching feature box BFBc, e.g. implementing voice-activated personal assistant functions. Calls whose target is the mobile address will be routed through the target features boxes of the mobile address and finally come to the call conferencing feature box. If this feature box is still connected to the interface box where the customer is located, the customer and the new call can be connected. In FIG. 3, this permits the customer to call y and be called by z and to conference them or switch between them. If the call conferencing box is no longer connected to the interface box, it can regard the customer as unavailable. Alternatively, it can obtain the original source address from the authentication box, store it, and attempt to reach the customer there.

As noted above, bound feature boxes can be advantageously bound to addresses. Thus, for each type of bound feature box and for each address that subscribes to that type of box, there is a specific feature box to which all relevant communications are routed. It is notable that this aspect of bound feature boxes obviates the need for an addressable feature box, as specified in the original DFC classification of feature boxes. Thus, a teleconferencing bridge can be represented as follows: all of the addresses used to reach the teleconferencing bridge are owned by a pseudo-customer representing the service provider. The primary address subscribes to the teleconferencing feature, which is provided by a bound box. The secondary addresses subscribe to forwarding features that forward usages to the primary address. The teleconferencing bridge box can distinguish between calls placed to various secondary addresses by looking at the dialed field of the incoming setup message.

Resource Interfaces

In accordance with another embodiment of the present invention, it is advantageous to expand the class of interfaces in the distributed feature system to include what are referred to as resource interface ("RI") boxes. Resource interface boxes provide a mechanism for performing media processing explicitly and can have one or more ports depending on the size and capabilities of the resource itself. Certain types of media processing cannot be specified statically and uniformly and, instead, can require both control and status events and many control arguments. Examples of such control-intensive devices that can be regarded as a resource by a resource interface are:

a DSP used for voice recognition;

an announcement server;

a recording device that can record and store a small number of messages for subsequent—possibly immediate—playback;

a shared voicemail server;

a mixing device that can do more precise mixing than the summing performed by a media switch processing unit, e.g. mixing streams with specified relative volumes, etc.

Figure 4:
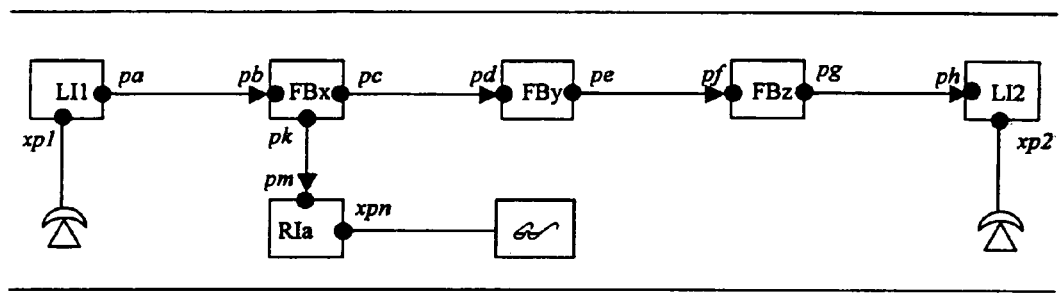

As another example, FIG. 4 sets forth a resource interface box, Ria, attached to a monitoring device. The feature box, FBx, is monitoring the voice coming from LI1 and searching for a particular pattern such as a DTMF tone (or waiting for a timeout signal).

As with user-communication devices, there are many different kinds of media-processing devices, each with its own special set of signals. It is advantageous to have different box program for each type of media-processing device, defining the signals used with devices of that type. Thus, each resource interface knows how to handle the control/status signals of its device. A feature box programmer who wishes to use a resource of a particular type places a system call addressed to that type of resource. The call is routed to a resource interface box representing a resource of the right type. Once the call is placed, the feature box can use the resource by opening and closing media channels, sending control signals, receiving status signals, and internally connecting media channels of the resource call with media channels of the box's other calls. If the feature box wishes to store or retrieve media recordings, which reside on media storage external to the distributed feature system, it can refer to the recordings by means of pointers. These pointers can be stored by the feature box as operational data.

Figure 5:
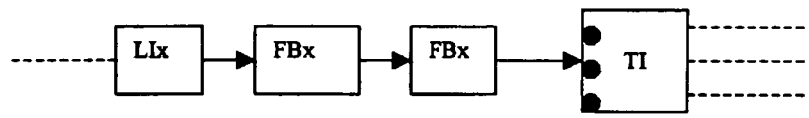

It is also advantageous to include in the class of interfaces a trunk interface ("TI") box which demarcates the boundary between the distributed feature system logical network and other networks. See FIG. 5. Trunk interface box TI in FIG. 5 connect the distributed feature system to other telecommunication systems. It is axiomatic that an open telecommunication system must be able to interoperate with other systems. The trunk interface serves as an interface, for example, to a circuit-switched trunk or trunk group or as a gateway onto a packet-switched network. A trunk interface can have any number of ports, and the mapping from trunk addresses to trunk interfaces is many-to-many. By aggregating interoperation facilities into many-port trunk interfaces, this has the advantage of practically eliminating possible routing problems arising when a usage is routed to a busy interface box. An interface box with multiple external channels can resolve problems such as trunk glare internally and autonomously by changing external channels when necessary (trunk glare is a problem that occurs when two switches at the two ends of a trunk both seize the trunk for an outgoing call thinking it is idle). Moreover, it is possible to allow implementors to address external routing requirements without making such choices a part of the distributed feature architecture.

In accordance with another embodiment of the present invention, operational data (e.g. 160 in FIG. 1) can be partitioned by feature, by customer, or both. Partitioning operational data by feature supports feature modularity by preventing access to data of other features. Features that choose dynamically among various addresses, however, need to know about all the addresses used by a customer. Accordingly, some operational data is more naturally and conveniently partitioned by customer than by feature; otherwise data representing the configuration, addresses, and media choices of a customer would have to be replicated for every feature that uses it. Nevertheless, a customer's data must be protected from accesses by other customers, so it is advantageous to permit a customer's data partition to be accessed only by feature boxes in a source or target zone of the one of the addresses of the customer.

Formal Specification

FIGS. 6A-6D set forth a formal specification of the types and data in a distributed feature system in a preferred embodiment of the present invention. The types and data in the system are expressed as atomic members of the disjoint sets "box", "boxType", "feature", "symbol", "customer", and "dataRelation". Their relations are formally expressed in FIGS. 6A to 6D utilizing the Z notation. See, e.g., J. M. Spivey, "The Z Notation: A Reference Manual", Prentice-Hall International 1989, pages 95-109. Boxes are classified as suggested above: line interface ("LI") boxes, trunk interface ("TI") boxes, resource interface ("RI") boxes, bound feature ("BF") boxes, and free feature ("FF") boxes. See FIG. 6A, lines 1002-1006. The feature box types are further partitioned into the types of bound features and the types of free features. Every feature box has a unique type, and every type contains at least one feature box. See 1014-1021. Every feature is provided by one or more types of feature box. The "providesFeature" function maps each type to the feature it helps provide. See line 1024.

As described above, the routing structure is based on zones, which are defined as set forth in FIG. 6A, line 1026. The relation "boxZone" describes which box types can be routed to in which zones. Every box type must appear in at least one zone, and some appear in more than one zone. No bound types, however, appear in the dialed zone. See lines 1028-1032. There is a precedence relation constraining routing order. Although it is not stated formally here, the precedence relation is a partial order. In the routing order, all boxes in the source zone precede all other boxes, and all boxes in the target zone follow all other boxes. Also, the precedence relation must be consistent with boxZone. See lines 1034-1039.

Rather than have a fixed and unified addressing and signaling alphabet based on conventional telephony DTMF symbols, it is desirable to have a larger addressing alphabet, especially to accommodate the use of proper names, email addresses, and various Internet addresses. On the other hand, it is undesirable to mandate a huge addressing and signaling alphabet for all systems. Mindful of these design tradeoffs, it is advantageous to define two alphabets, one used for addressing ("AAlphabet") and one used for signaling ("SAlphabet"), which can be chosen freely by the creators of the system. See FIG. 6B, lines 1040-1041. Experience with conventional telephony suggests that it is advantageous for the addressing alphabet to be a proper subset of the signaling alphabet, i.e. line 1043. This is extremely useful as it permits addresses to be spelled out as signals or sequences of signals with symbols left over to serve as delimiters.

An address is defined formally as merely a sequence of symbols from the addressing alphabet, as set forth in FIG. 6C, line 1048, and is defined as a subset of AString, the strings over AAlphabet, containing the empty string (" ") as a null value. Except for the distinction between AString and its subset address, which can be used to impose length restrictions on legal addresses that do not apply to dialed strings, it is advantageous to avoid any other built-in notion of a dialing plan. The relation "dialedTrigger", as set forth in lines 1050-1051 indicates which strings activate which feature boxes in the dialed zone. There are several subsets of "address" which can be defined. The empty sequence is used as a null address, and does not belong to any of these subsets. "LAddress" is the set of addresses that uniquely identify line interfaces, and LMap is the total bijection relating the two. "TAddress" is the set of addresses that map to trunk interfaces. This means that they are used to reach line interfaces on other telecommunication systems. Many members of TAddress can be reached via one trunk interface, and many trunk interfaces can be used to reach one member of TAddress. If a trunk address is not in the range of TMap, then it is supporting only trunks for incoming calls. "RAddress" is the set of addresses that map to resource interfaces. The mapping is actually one-to-many and invertible, which is expressed by the fact that the auxiliary relation QMap is a function. "MAddress" ("mobile address") is the set of addresses that are in use without being permanently associated with particular line interfaces. In addition to these address sets, "CAddress" is the set of addresses that are owned by customers. Every customer owns at least one address. The addresses owned by customers are a subset of the addresses in use for lines, trunks, and mobile access. See FIG. 6C, lines 1081, 1083.

Any address in use can subscribe to feature boxes and have boxes bound to it. This includes resource addresses and trunk addresses that are not owned by customers. See FIG. 6D, lines 1100-1106. The relation "supportsFeature" indicates which relations of the operational data are associated with which feature. The set "supportsCustomer" indicates which relations of the operational data are partitioned by customer. See lines 1109, 1111. All operational data is feature data, customer data, or both. See line 1113.

Figure 9:
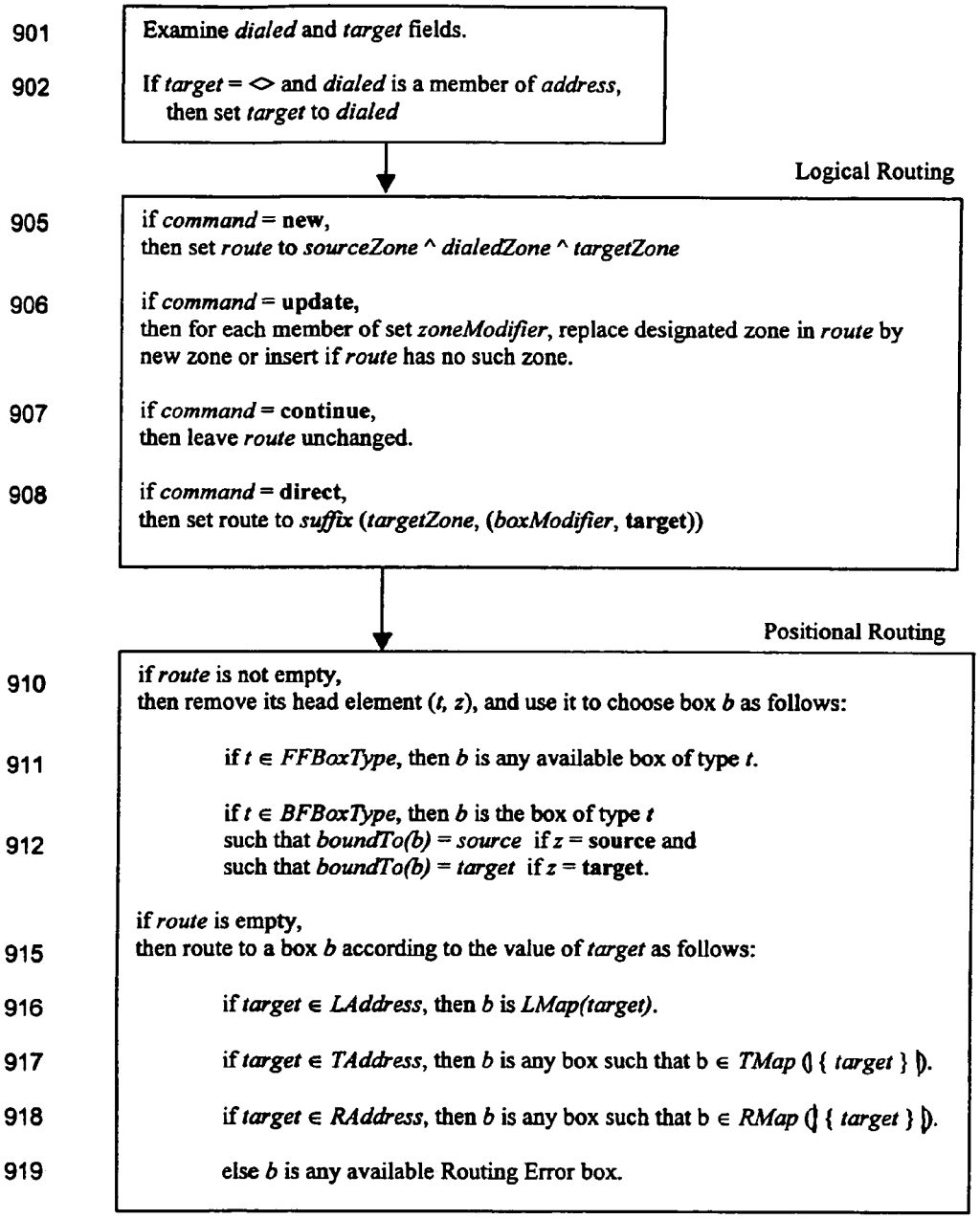
FIG. 9 is a flow chart setting forth a routing method in a distributed feature system in accordance with a preferred embodiment of the present invention.

FIGS. 7 through 9 set forth details regarding routing in the distributed feature system, in accordance with a preferred embodiment of the present invention. FIG. 7 sets forth the fields and types in a setup message. The routing command can be any of the following four commands:

routingCommand ::= new | update | direct | continue

An empty sequence is used as a null value in a route field. An empty string (which is also an empty sequence) is used as a null value in a source, dialed, or target field. The value of the zoneModifier field is signficant when and only when the value of command is "update." The value of the boxModifier field is significant when and only when the value of command is "direct." Other constraints on setup messages are described below.

A line interface initiates a usage in the distributed feature system by sending a setup message to the router. The setup message of a call placed by a line interface has the format set forth in FIG. 8A. Where a trunk interface is placing the call, the setup message has the format set forth in FIG. 8B. A box may not access the route field of any setup message except to set it to the empty sequence or to copy the route from one setup message to another setup message (without examining it).

On receiving a setup message from any box, the router proceeds to execute the steps set forth in FIG. 9. The router first examines the dialed and target fields. If the target=< > and the value of dialed is a member of address, then the router sets target in the setup message to the value of dialed. The router then modifies the route if necessary in a phase referred to as logical routing. For a given setup message, the following values are defined, all of which are of type P (FboxType×zone):

sourceSet = subscribes ( { source } ) ▷{ source }
targetSet = subscribes ( { target } ) ▷{ target }
dialedSet = DialedTrigger ( { dialed } ) × { dialed }

The expression subscribes ({source}) yields the set of all members of boxZone to which the address in source subscribes. The operator ▷{source} gets rid of all the members of boxZone referring to the target zone, leaving us with a set of pairs of the form (FBoxType, source) as the value of sourceSet. The feature box types in this set are those to which the source address subscribes in the source zone. Furthermore, sourceZone is a sequence with the same membership as sourceSet and ordered in agreement with the partial order in precedence. targetZone is a sequence with the same membership as targetSet and ordered in agreement with the partial order in precedence. dialedZone is a sequence with the same membership as dialedSet and ordered in agreement with the partial order in precedence.

In logical routing, the router modifies the route field of the setup message as set forth in 905-908 in FIG. 9. If the command is "new", then the route is set to the concatenation of the sourceZone and dialedZone and targetZone. If the command is "update" then consider the set zoneModifier. For each member of this set, replace the designated zone in the old route by a new zone as defined above. If the old route has no such zone, then insert rather than replace. If the command is "continue," then leave route unchanged. If the command is "direct," then consider the box type boxModifier and the box type t from which the setup message was sent. The following must be true:

∃f: feature· providesFeature(t)=f ˆ providesFeature(boxModifier) = f (boxModifier, target) ∈ subscribes ( { target } )

Now set the route to suffix (targetzone, (boxModifier, target)), the value of which is the suffix of targetzone beginning at the first occurrence of (boxModifier, target). Note that the command "new" can be regarded as a shorthand for "update" with zoneModifier={source, dialed, target} and the command "continue" can be regarded as a shorthand for "update" with zoneModifier={ }. Also note that all the constraints mentioned so far in this section can be enforced by static analysis.

Next and finally comes a phase in which the router chooses a box to which to route the usage. This is sometimes referred to as positional routing. If the route is not empty, then remove its head element (t, z) and use it to choose a box as set forth in 911 and 912 in FIG. 9. Note that the existence of such a free box in line 911 is assumed, whereas the existence of such a bound box in line 912 is guaranteed by a constraint set forth above. If the route is empty, then the router will route to a box b according to the value of target as set forth in FIG. 9, lines 915-919. Note that routing error boxes are like free feature boxes, and the existence of an available one is assumed.

A box of type I should only be allowed access to operational data relation d if d is not feature operational data, or if d is feature operational data of the feature provided by boxes of type t. Formally, (t, d) must belong to:

boxFeatureData: FBoxType ↔dataRelation
boxFeatureData=(providesFeature;supportsFeature~)∪ (FBoxType×(opRelation\dom supportsFeature))

All operational data relations in the set supportsCustomer are partitioned by customer. A box can only access the partition of such a relation belonging to customer c if in this episode of use, the box first joined a usage because its type appeared in a sourceZone or targetZone of CAdress member a, and owner(a)=c.

Additional Service Examples

Media Choice. Automatic media choice can be provided as a feature. The power user is an early adopter and wants all her devices, whether PC or land-line telephone or mobile telephone, to work together in a convenient and sensible way. The customer can use a mobile address as a generic address for communication in all media which subscribes to a media-choice feature in the target zone. When called, this feature box makes a media choice based on the characteristics of the source and the desires of the customer, then turns the media choice into a device choice. The usage is then forwarded to the chosen device's own address, so that it can be routed through all the device features.

For example, there are persons who use text conversations (telecommunication connections in a text medium) so frequently and casually at work that they think it impolite to place a voice call to a colleague without first checking the person's availability by means of text. Such a person, convinced that workplace customs have changed for good, might adopt a new screening feature which ensures that a customer's telephone never alerts him of a request for a voice conversation unless a text conversation is in progress between the same two customers. If the precondition of voice conversation is not satisfied, then the voice request is immediately handled by a coverage feature such as voice mail. Current social customs make it acceptable to delay conversations through the text medium ("busy right now—how about this afternoon?") but less so when the voice connection is already established. A person can pretend not to have seen the most recent text transmission, but cannot pretend not to have answered the telephone.

It should be kept in mind that media choice as a new telecommunication function exhibits a new class of feature interactions. For example, a person might purchase a new "multimedia telephone" allowing communication by voice, video, text, and images simultaneously. The assumptions of the manufacturers of this device is that voice is the primary medium. All calls entail a voice channel. Once a voice channel is opened, channels carrying additional media can be added if both customers desire it and have appropriate device capabilities. This assumption is deeply embedded in the user interface of the multimedia telephone and in the features provided for use with it. Clearly the media choice feature specified above and the features of the multimedia telephone have an undesirable interaction. Both embody rigid automatic protocols for media choice. Since the protocols, in essence, deadlock, users of these two protocols cannot communicate directly with one another.

Where the conflicting features were specified by the present invention, however, each feature would be represented by a separate feature box. The program for each feature box would be a relatively simple finite-state machine. Once the features were suspected of interacting undesirably, it would be easy and efficient to create a cluster of processes and queues simulating the usage, and to use a model-checker to detect potential deadlocks. The modularity of the present invention supports analysis by making it easy to isolate the features of concern, and to analyze their interaction without the added complexity of other features.

Mailboxes. A "power" user needs a unified multimedia mailbox. Messages can be stored in this mailbox by free target-zone feature boxes of all devices owned by this user, and retrieved from this mailbox by free source-zone feature boxes of all devices owned by this user. The simplest way to achieve this goal is to store pointers to the messages in customer operational data (which can be accessed by many different mail-oriented features). To use a pointer to store or retrieve a message, a feature box must call an appropriate media resource, and pass the pointer to it.

Figure 10:
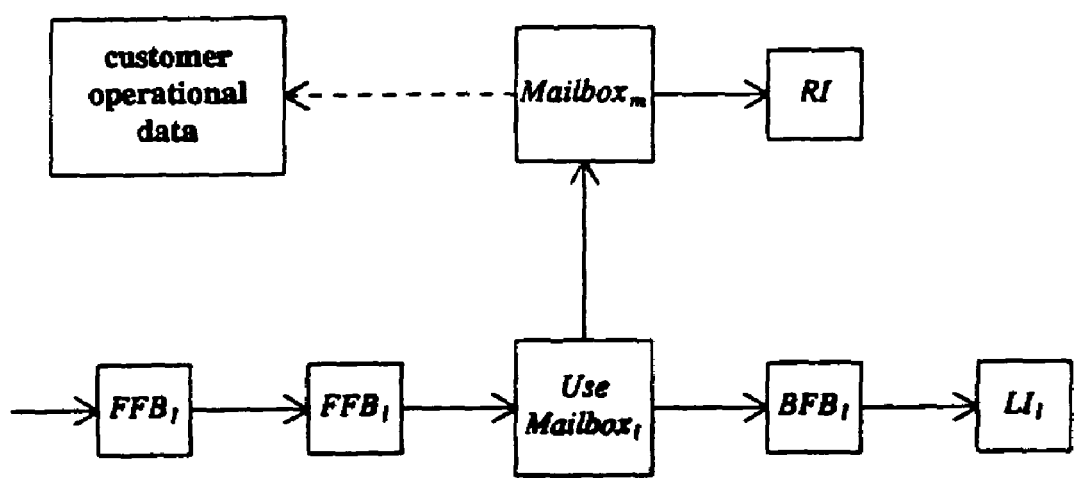
FIGS. 10 through 17 are abstract diagrams of feature components in a distributed feature system illustrating other embodiments of the present invention.

The simple scheme can be criticized on the grounds of insufficient modularity: every feature using the mailbox must have full logic for mailbox searching and cleanup, as well as mail storage and retrieval. In response to this criticism we propose a separate feature just for managing a mailbox, as shown in FIG. 10. "Use Mailbox" is a free feature box, subscribed to by l, that sometimes offers a caller the opportunity to record mail for the customer that owns l. If a caller accepts this opportunity, then "Use Mailbox" makes a call addressed to m, which is a member of MAddress owned by the same customer and dedicated to mailbox capabilities. The address subscribes to the free feature box "Mailbox," which encapsulates all the logic for managing a mailbox. It makes calls to media-processing resources as necessary, and also accesses the customer's operational data, where the mailbox indices and pointers are stored.

Since DFC does not fully constrain access to operational data, the access control provided by DFC should be augmented as needed by individual features. In this case, several free boxes could be attempting to access a customer's operational mailbox data simultaneously. Their access should be subject to some form of readers/writers synchronization. Alternatively, the mailbox address could subscribe to a mailbox feature implemented by a bound feature box. In this case the mailbox data could be local data of the bound feature box. The primary advantage of the bound mailbox is that calls can meet there. If a caller is currently connected to the mailbox so that the caller can leave a voice message, and if the mailbox customer is also connected to the mailbox for the purpose of retrieving voice messages, then it is possible to connect the caller and the customer within the mailbox so that they can actually talk to each other. Using either alternative, the mailbox address can subscribe to other features with earlier precedence than the mailbox or mail-access features. These features can build on basic mailbox capabilities, creating enhanced capabilities incrementally. Such features might include searching, text-to-speech and voice control for hands-free operation, and queueing (see next section).

Fair Competition and Presence Information. Sometimes many boxes compete to call a single box at the same time. The popular callee box might be a bound feature box serving as a mailbox, or it might be the line interface of a service agent working for a customer-contact center. DFC routing does not provide any built-in fairness mechanism for these callers. If a call is rejected because the callee box is busy, the rejected caller box earns no increased priority for its next attempt. This is not necessarily a problem. For example, email messages competing to enter a mailbox can be buffered in individual free boxes, so that no connections with the sources of the email need be maintained. In the very worst case, when a free box fails to deposit the email after a long series of retries, it can time out and return the email to its source.

Sometimes, however, a fairer form of competition is required. One means to this end is the introduction of a "queuing box", which is a bound feature box routed to before the target (or targets, in the case of service agents). A queuing box has multiple callee ports and an internal queue, so that it can accept the calls of multiple callers and respond to them in some fair order such as FIFO. When a target is idle, which the queuing box knows because all communication with the targets goes through it, the queuing box makes a call to the idle target on behalf of the highest-priority queued caller.

Figure 11:
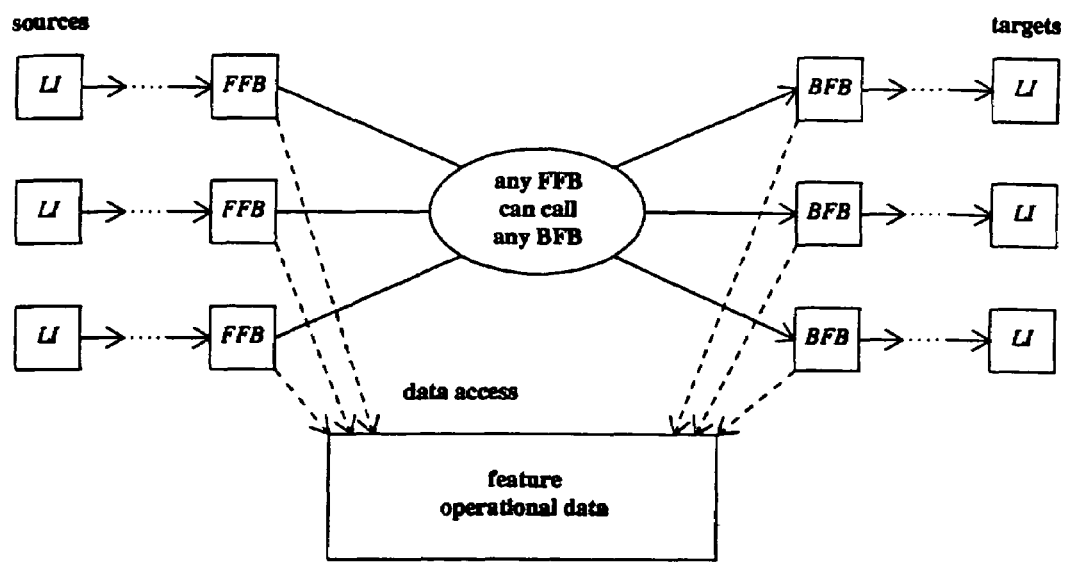

The trouble with a queuing box is that it has a fixed number of ports for callers; if these are all busy then subsequent callers will not enjoy fair service. An attractive alternative is to distribute the functions of the queuing box over a number of free and bound feature boxes; these boxes all belong to the same feature, and can therefore communicate through feature operational data. This alternative is illustrated in FIG. 11. If FIG. 11 represents a customer-contact center, then a customer dials a general contact address for the center, and his usage is routed to a free target-zone feature box subscribed to by the contact address. This free box plays queuing announcements to the customer, and places him in the queue by means of an access to feature operational data. For this feature it would be useful for the free boxes to access the operational data by means of blocking non-exclusive procedure calls that do not return until the accessing box is enabled to make an outgoing call to a service agent. (In this case "blocking" is a relative term. Even when blocked, the feature box must be able to respond to a teardown from its source line interface.)

Each potential target—a service agent in the case of the customer-contact center—subscribes to a bound feature box under its own address. This feature box keeps track of the status of the agent by monitoring activity through the box and by interacting directly with the agent for logon/logoff. It deposits agent status information in the operational data by means of some nonblocking form of access. When a service agent is available, the highest-priority queued caller is unblocked and given the agent's address to call.

Agent status information can only be perfectly reliable under very restrictive circumstances. For instance, to guarantee that the customer gets through to an allegedly available agent, the agent must not be able to place any calls, and must not be able to receive any calls except from contact-center customers. If the rules for agents are any less restrictive, then there must be a fair retry mechanism for the occasional customer whose call to an agent is rejected.

The structure of FIG. 11 can also be used to provide the presence information that is an integral part of the popular Instant Messenger ("IM") service. IM customers would have bound feature boxes to monitor their presence on-line and make deposits in the feature operational data. IM customers could also access the presence information of their buddies through free feature boxes in their source zones. The primary difference here between customer-contact centers and Instant Messenger is that IM has no queuing, since IM customers are not interchangeable.

Shared Devices. In systems with mobile and multimedia services, there are likely to be many other feature sets besides default features, used for many other purposes. For example, a customer might have a personal feature set, subscribed to by a mobile address rather than a line address, that he uses from whatever device he happens to be closest to. For another example, a customer might use the same home device for personal communication and for work as a service representative; these two purposes might require very different feature sets. For another example, the same home device might be used by several family members, each of whom has a customized personal feature set. In such a system, it will often be the case that a device is being shared among several feature sets simultaneously. This will be the source of many feature interactions between sharing feature sets. Such feature interactions are different from interactions among features of the same feature set, whether they relate to one medium, multiple media, or signaling alone. The grouping into sets causes the interactions to appear at a different level of abstraction.

Consider a customer who likes multimedia services but has not single device that can handle all her favorite media. Fortunately, software features can make several devices function as one multimedia pseudo-device. One way to achieve this is to regard one device as primary, so that its address is also the address of the pseudo-device. When a feature of the primary device chooses to add another medium to the conversation, it calls a device able to handle that medium. Such a device is shared between two feature sets, one supporting its use as a stand-alone device, and one supporting its use as a secondary part of a multimedia pseudo-device.

If a device is shared by several feature sets, then in any situation involving a customer call initiated from or directed to that device, the correct feature set or sets must be applied. This selective application is itself advantageously achieved by features. How can the appropriate selective application of feature sets be achieved?

Often we want both the default feature set and an alternate feature set applied in either the source or target zone. This is always the requirement when there is no previous agreement between the owner of the shared device and the subscriber to the alternate feature set. In such a case, the alternate feature set should not have the power to bypass or elude the default features of the device, which may include features subscribed to by the device owner for his own protection. The first question we must ask about alternate features sets is: how or why are they invoked? Like default feature sets, alternate feature sets must be subscribed to by addresses (in this case mobile addresses). An alternate feature set is applied in the target zone because the caller chose it by dialing the alternate address. For example, a person might have a personal address that subscribes to a personal feature set. She gives the personal address to all of her friends, who use it to call her wherever she is currently located.

Figure 12:
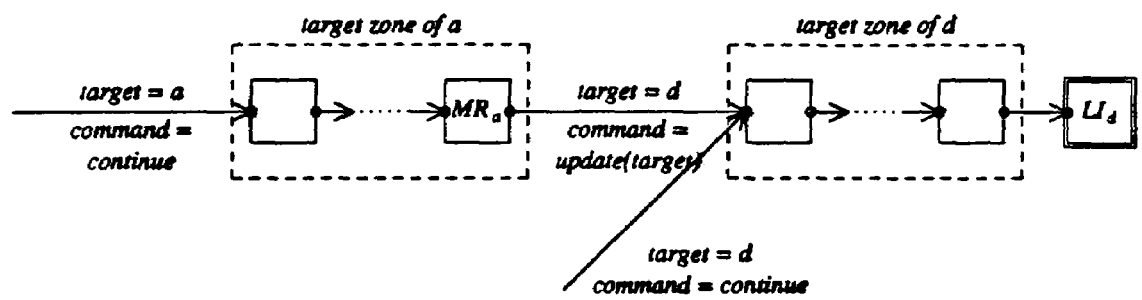

FIG. 12 shows a DFC pattern for applying a default feature set and an alternate feature set in the target zone. The diagram begins (on the left) with an internal call whose target is the alternate address a. Previous zones of the route have been exhausted, so the internal call is being routed to the first box of the target zone of a. The Mobile Redirection feature (denoted "$MR_a$") relies on operational data maintaining the current address of the owner of a, which is now d. This information has many possible sources. It might be supplied to the system manually by the owner of a, either through a provisioning interface or, more dynamically, through a feature. Or it might be collected automatically through various types of sensors. MR places an internal call with target=d, an update(target) command, and the same route that came with the internal call is received. This will cause the router to replace the target zone of the old route (now actually empty, because MR should be the last feature box in the target zone of a) with the target zone of d. After this change to the route, the internal call will be routed to the first box of the target zone of d. Although some of the boxes in either target zone might be bound, none of the them have to be bound, and they are shown in FIG. 12 as free. DFC places the limitation that no port can ever participate in two calls simultaneously. The purpose of the second arrow in FIG. 12 going to the first box of the target zone of d is to show another possible usage. A customer call dialed to d will result in a usage whose target zone is simply the target zone of d. If all the boxes of the target zone of d are free, then the two usages indicated will have two complete, separate copies of the target zone of d. If some box is bound, on the other hand, then the two indicated usages will join at the first bound box. The two target zones must be ordered as shown in FIG. 12, because it takes the MR feature in the source zone of a to find d. This is indeed fortunate, because the target zone of d must stand between $LI_d$ and the target zone of a, to protect the device from assault. Although only DFC controls feature priority through position in a usage, any other feature-composition scheme would have to achieve a corresponding relationship between the two feature sets.

Figure 13:
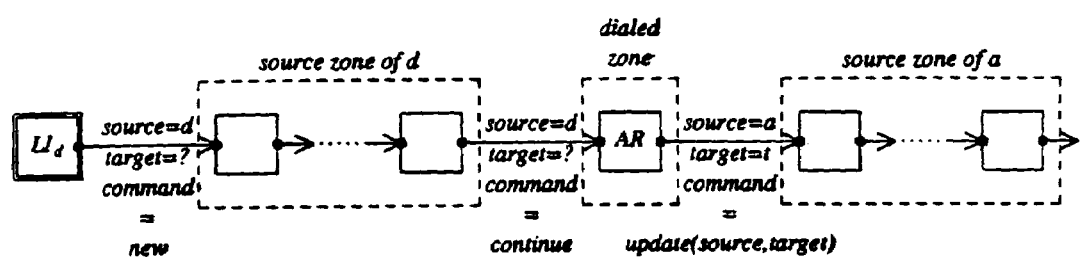

FIG. 13 shows a DFC pattern for invoking a default feature set in the source zone, followed by an alternate feature set in the source zone. It is difficult for a person who places a call from a stranger's device to invoke an alternate feature set such as his own, personal source-zone features. They have no association with the source address, nor with the address of the target he wishes to reach. One way to solve this problem is some form of double dialing, in which the caller first dials a special address just for the purpose of invoking alternate features. Later he is prompted for and dials the actual target address. In FIG. 13, dialable string z matches the triggering pattern of the dialed-zone feature Authentication and Reattribution (denoted "AR"). The AR feature will prompt the caller for the mobile address he wishes to use (here a) and for proof of his right to use it. Then AR will prompt the caller for the address he wishes to call, here t. The string z might or might not look like an address. Assuming that it cannot be interpreted as an address, there will be no targets or target zones in the setup signals of the chain until after the AR box. The setup signal issued by the AR box has a new source and a new target, so both zones of the route must be updated. The two source zones should be ordered as shown in FIG. 13, because there is no authorization of any kind for omitting any of the source-zone features of d. Although here DFC controls feature priority by placing default features closest to their device, any other feature-composition scheme would have to achieve a corresponding relationship between the two feature sets.

When the owner of a shared device and the subscriber of an alternate feature set are willing to cooperate (often because they are the same person), more flexible arrangements of features are possible. In the basic arrangement considered here, the default features of the device are divided into two subsets, essential and optional. The essential features always apply to customer calls using the device. In addition to essential features, optional or alternate features may apply.

Figure 14:
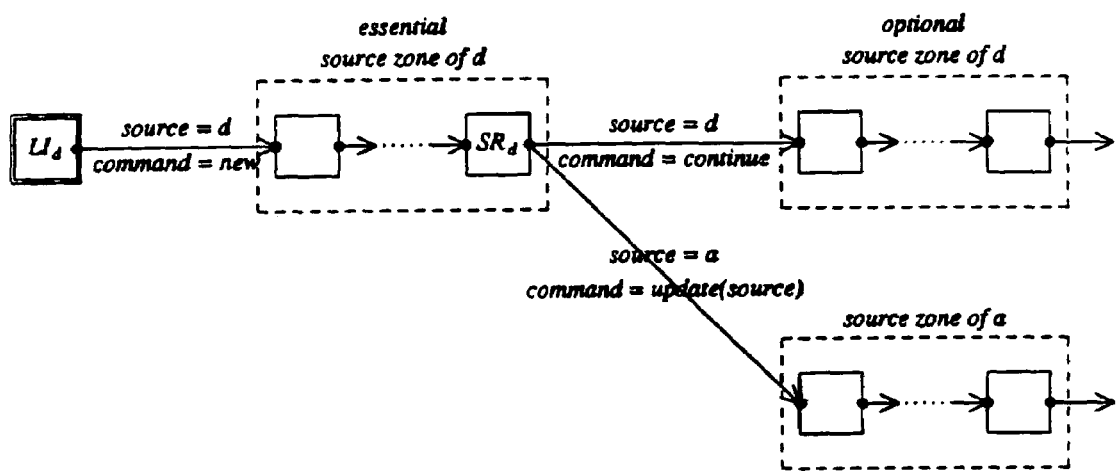

FIG. 14 shows a DFC pattern for achieving this in the source zone. As in FIG. 12, the depiction of two internal calls at the same port is an indication of two different possible usages. The Selective Reattribution feature (denoted "$SR_d$") must be the last of the essential features of d, since it serves as the branching point: depending on what kind of an outgoing call it makes, the next features applied to the customer call will be optional or alternate ones. To achieve this pattern, of course, d must subscribe to SR and the operational data of SR must include the alternate address a. In any of these patterns, any feature set can be empty unless it includes a named feature box—the named features are the necessary ones. Thus, in FIG. 14, the optional source zone of d might be empty, and SR would always chance the source of a. More commonly, however, the SR feature box would interact with the caller to determine whether the caller chooses optional or alternate features. If the caller chooses alternate features, authentication of privileges may also be required. Depending on the device apabilities and user-interface conventions, signaling between the SR feature box and the caller might be in-band or out-of-band, using specialized signals or standard ones such as DTMF tones. This pattern is most obviously useful for a device used by a group of people, such as a family. The alternate features could be the customized personal features of a particular family member. Or, the alternate features could be used by a family member when playing a job-related role.

Figure 15:
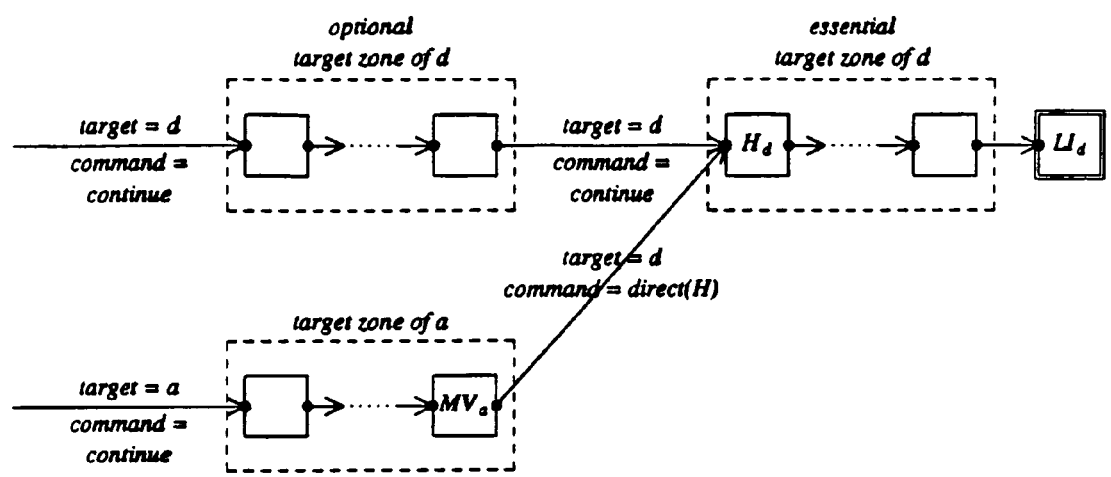

FIG. 15 shows a DFC pattern for satisfying the basic requirements in the target zone. The caller makes the choice between optional and alternate features by directing the call to target address d or a. As with FIG. 14, this pattern is useful for sharing a device within a family. It is also useful if the device is being used both as a primary device identified by d, and as a secondary member of a multimedia pseudo-device under the address a. In the latter case, a is not made public, as it is only used by the features that make a multimedia pseudo-device out of several ordinary devices. The Mobile Visitor feature box (denoted "$MV_a$") must be the last box of the alternate feature set. The Host feature box (denoted "$H_d$") must be the first box in the essential subset. These two feature boxes are actually part of the same device-sharing feature. Because the device participates in this feature as the host, d subscribes to the Host feature box. Because mobile address a participates in this feature as the visitor, a subscribes to the Mobile Visitor box. Because these two boes are part of the same feature, they can have a special relationship without violating feature modularity. Specifically, MV is allowed to name H as the argument of a direct routing command. The result of the router's interpretation of this command is a route consisting of the segment of the target zone of d beginning at H. As in FIG. 12, all the boxes of the essential target zone of d might be free. In this case, each of the two usage possibilities shown in FIG. 14 would have its own separate copy of the boxes of this zone.

As can be seen from the four fairly-comprehensive patterns presented in FIGS. 12-15, the present invention does a good job of describing the various behavioral possibilities for this type of feature interaction in a straightforward manner and without loss of modularity. Describing the behavioral options in DFC terms makes it easy to focus on the important aspects of this type of feature interaction, which include such questions as: When and how are dynamic choices between feature sets made? Are feature sets composed by conjunction or disjunction? Which data, agreements, and subscriptions are needed? The answers to such questions show up rather clearly in the diagrams.

Shared devices introduces the possibility that two source-zone features in different feature sets could interact, and also that two target-zone features in different features sets could interact. These interactions are often between similar features, or features with related purposes. The following are examples of such interactions.

What happens if two target zones, both containing Call Waiting features are composed? Call Waiting is a complex feature for many reasons. Even from the perspective of the customer who subscribes to it, it has both positive and negative aspects. On the positive side, more calls directed to the customer will get through. On the negative side, conversations in progress will be interrupted. The first concern, in minimizing negative interactions and maximizing positive ones, must be to ensure that there are no disastrous runtime conflicts or inconsistencies. The second concern should be to maintain a fair balance between call completion and call interruption. If the target zones are composed as in FIG. 12, any customer call can interrupt any other customer call, although the dynamic priorities can vary depending on whether the interruption takes place in $CW_a$ or $CW_d$. Because there is no prior agreement between a and d, there is nothing that can be done to alter the priorities, but at least DFC feature composition ensures that there will be no disasters. If the target zones are composed as in FIG. 15, and if $CW_d$ and is placed among the optional features, then we have the interesting behavior that calls directed to a can only be interrupted by other calls to d.

Figure 16:
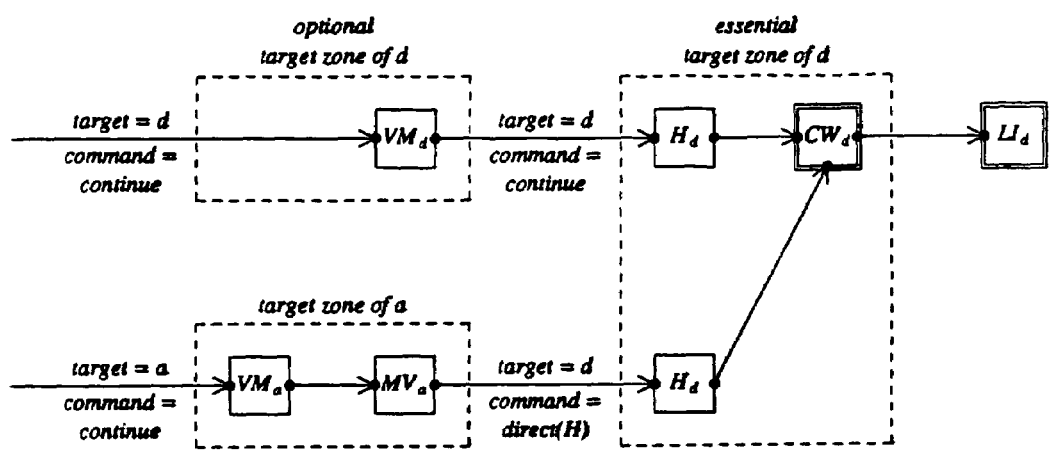

FIG. 16 illustrates an advantageous arrangement, in which only d subscribes to Call Waiting, and Call Waiting is an essential feature. This will allow completion and interruption on the fairest and friendliest basis. Note that FIG. 16 is an exact likeness of a single DFC usage, in which there are two copies of the free box type H, and the two branches of the usage join at the three-port Call Waiting box. If desired, it would also be possible to achieve an asymmetric arrangement in which one class of calls has clear priority over another class. This would be similar to an "Emergency Break-In" feature. Either a or d, or both, could subscribe to a Voice Mail feature. It is highly desirable that an uncompleted call directed to a be served by $VM_a$, and that an uncompleted call directed to d be served by $VM_d$. If FIG. 12, this desirable feature interaction is difficult to achieve. A busy signal from $LI_d$ will reach $VM_d$ (if any) before $VM_a$ (if any) and the first Voice Mail box to receive a busy signal will process and absorb it. $VM_d$ will ignore a busy condition and propagate it to $VM_a$ only if it is specifically programmed to do so, and it can only be programmed to do so if some indication is preserved that the call was originally directed to a. This would be a loss of modularity, but the problem seems to be exposed by DFC more than caused by it. Indeed, it is difficult to imagine why a feature subscribed to by d should make an exception for a when there is no prior agreement between their owners. In FIG. 15, the desirable feature interaction is easy to achieve, as shown in FIG. 16. A busy signal on either path will originate at the $CW_d$ box and travel backward along the path to the correct VM box. This works even if there are separate $CW_d$ and $CW_a$ feature boxes, provided that each is later in its zone that the corresponding VM box.

Figure 17:
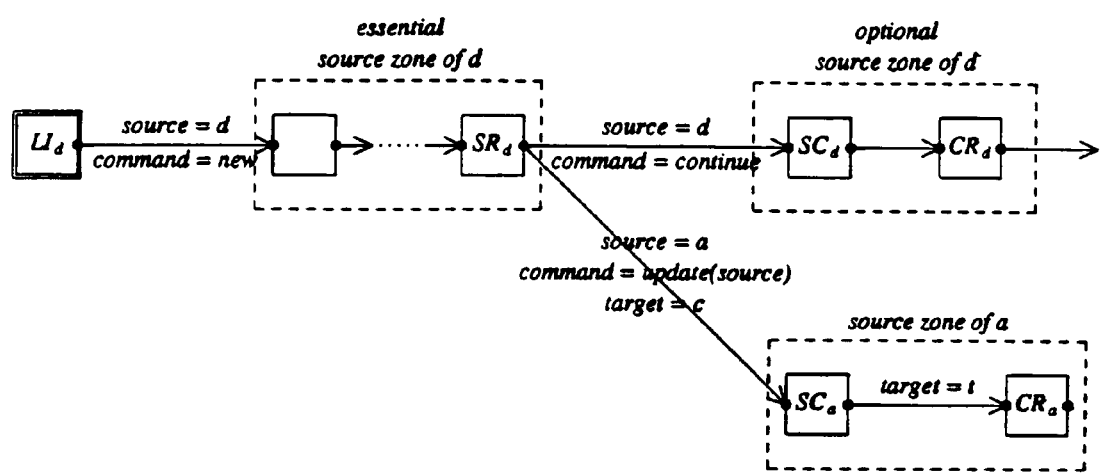

Concerning interactions between source-zones, the following example is related to dialing and exemplifies a good composition of Speed Calling and Call Restriction features. Speed Calling enables a user to dial short code which is translated by the feature to a full address. The feature maintains a database for performing this translation. Call Restriction prevents the placing of calls to certain addresses. The feature-interaction issue raised by Call Restriction is always that of scope: Is there any way to circumvent the restrictions through the use of other features. For example, can Speed Calling in the source zone of a circumvent Call Restriction in the source zone of d? Should it be able to? It is arguable that Call Restriction need not apply to the source zone of a. Calls placed from the source zone of a have a as their source and, very likely, as their billable address. Or a might be used only by an adult in the family that shares device d, and the Call Restriction feature is intended only to apply to the calls made by children. On the other hand, it is equally plausible that children in the family can have their own personalized feature sets, yet must adhere to all call restrictions. This would be a requirement in the context of cooperative source-zone composition, as in FIG. 14. FIG. 17 shows how the requirement can be satisfied in that context. Obviously Call Restriction must be applied after Speed Calling has performed its address translation (if any). In DFC, this means that Call Restriction must have a later position in the source zone than Speed Calling. If there are personalized SC boxes in both the optional and alternate source zones, then there must also be CR boxes in both zones. Even more cooperation is required between the owners of addresses d and a, as both must provision their CR boxes with the same restriction lists. FIG. 17 shows a blocking scenario on the lower of the two possible paths. The caller has dialed the code c, and uses $SR_d$ to choose to use the alternate source-zone features. $SC_a$ translates c to the forbidden target address t, so the usage is not continued by the $CR_a$ box.

Source-zone features have signaling dialogues with callers through the calling line interface and device. Target-zone features have signaling dialogues with callees through the called line interface and device. Device sharing does not exactly introduce new signaling problems, but it certainly exacerbates two old ones. The nicest user interfaces are designed with close coordination between the device—which generates and displays signals—and the features—which generate and respond to signals. Features designed without knowledge of the devices from which they will be controlled must use a restricted and often awkward signaling vocabulary, such as DTMF tones and in-band announcements. Mobile features sets fall into this latter category, because they are intended to be usable from almost any telecommunication device. Another old problem that gets worse with shared devices is signal ambiguity. If both default and alternate feature sets contain similar features, it is likely that both features will respond to the same signal. In this case it is inherently difficult to determine which feature the signal was meant for, and to ensure that the intended features is the only one that receives it. Since alternate feature sets must use restricted, standard signals, there is an additional incentive for default feature sets to use special, customized signals. Not only does it provide a better user interface, but it also reduces the danger of signal ambiguity when the device is shared. Ultimately, the only way to guarantee the absence of signaling problems is to anticipate all possible combinations of feature sets and analyze the compositions. This is not an easy task, but at least DFC feature composition provides a structure within which the analysis can take place.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description has been presented in the context of DFC; however, the principles of the present invention could be extended to distributed feature architectures. Such an extension could be readily implemented by one of ordinary skill in the art given the above disclosure.

The invention claimed is:

1. A network communications system for placing a usage communication over a network, the usage being placed from a caller to a callee through a set of feature modules in the network, each feature module being independent and communicating with other feature modules through featureless internal communications through the communications network, the system comprising:

a first interface for receiving a request from the caller to place a usage to the callee, the usage having associated with it a set of at least two communications features;

a set of communication channels for connecting the usage to the set of feature modules and to the callee, wherein each feature module is connected by a two-way communication channel to another feature module, and wherein the communication channels comprise multimedia channels, a path of internal communications over the set of communication channels to the set of feature modules, the path of internal communications determined by the features associated with the request.

2. The system of claim 1, wherein the communication channels comprise a signaling channel and multimedia channels, at least some of the multimedia channels connecting two or more feature modules.

3. The system of claim 1, wherein the signaling channels comprise two-way transmission channels.

4. The system of claim 1, further comprising a routing module, the routing module connected to each feature module by a two-way communication channel.

5. The system of claim 4, further including a database associated with the routing module for determining caller and/or callee subscriptions.

6. The system of claim 1, wherein a feature module performs a signal processing function on an input signal to the feature module, and transmits an output of the processed signal to another feature module.

7. The system of claim 1, wherein a feature module has a database associated with the feature module.

8. The system of claim 7, wherein the database has data relating to terminating the communication.

9. The system of claim 7, wherein the database contains data for routing the communication.

* * * * *